AUTOMATIC POLARITY SELECTOR
Filed Oct. 21, 1965
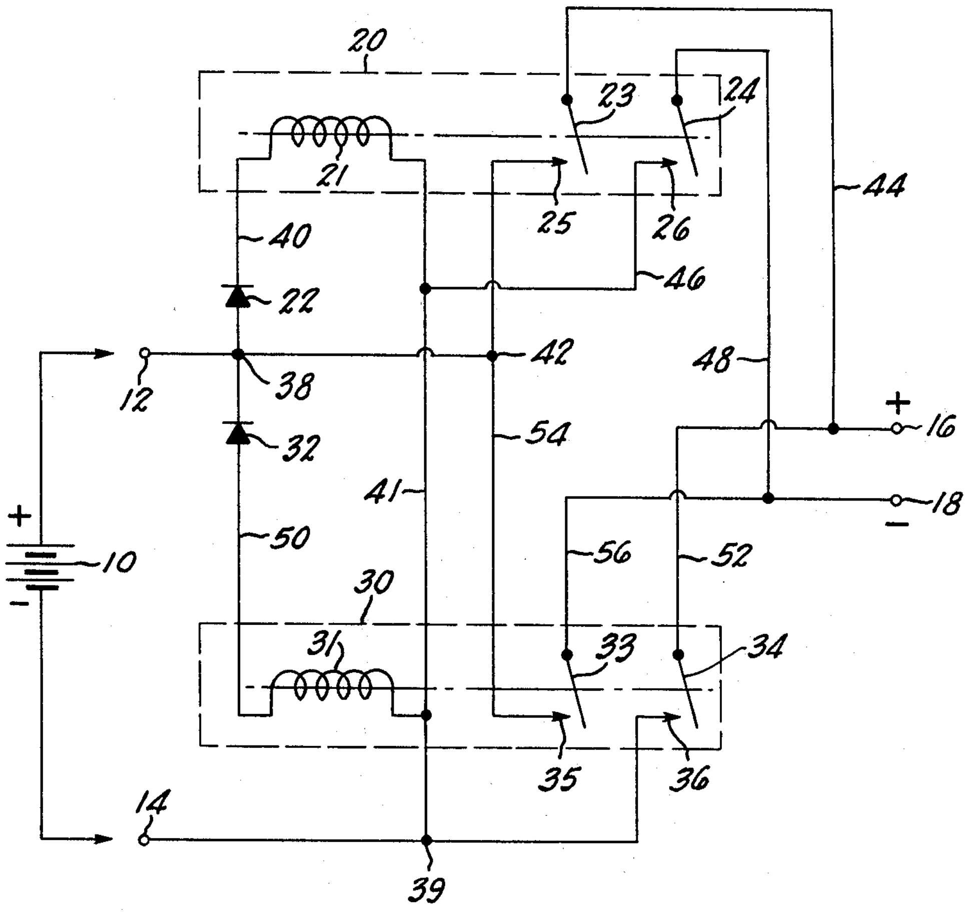
INVENTOR.
BERNARD J. GERSHEN
BY
Richard G. Stahr
HIS ATTORNEY United States Patent Office 3,413,487
Patented Nov. 26, 1968

3,413,487
AUTOMATIC POLARITY SELECTOR
Bernard J. Gershen, Edison, N.J., assignor to General Motors Corporation, Detroit, Mich., a corporation of Delaware
Filed Oct. 21, 1965, Ser. No. 499,476
1 Claim. (Cl. 307—127)

ABSTRACT OF THE DISCLOSURE

An automatic polarity selector circuit having first and second input circuit terminals across which a direct current potential source may be connected and positive and negative polarity output terminals having a consistent relative polarity. The operating coil of each of two double pole-single throw electric relays is connected in series with a respective diode across the input terminals, the diodes being oppositely poled. A stationary contact of each relay is connected to one input terminal and the other stationary contact of each relay is connected to the other input terminal. The movable contact of each relay corresponding to the respective stationary contact connected to the same input terminal is connected to a different output terminal and the other movable contact of each relay is connected to the other output terminal.

The present invention relates to an electric circuit which is sensitive to direct current potential polarities to automatically electrically interconnect the positive and negative polarity terminals of a direct current potential source to respective preselected positive and negative polarity output terminals regardless of the direction in which the direct current potential source is poled across associated input terminals.

With many applications, it is mandatory that the proper polarity relationship between two interconnected direct current potential sources be preserved. For example, to charge a conventional storage type battery, the positive and negative electrodes of the battery must be connected to respective positive and negative output terminals of the charger to prevent serious damage to or destruction of the battery. To parallel two or more direct current potential souces to a common bus, it is imperative that the correct polarity relationship be maintained.

It is, therefore, an object of this invention to provide an improved automatic polarity selector circuit.

It is another object of this invention to provide an improved automatic polarity selector circuit which is responsive to the polarity of a direct current potential source to automatically complete an electrical circuit between the respective positive and negative polarity terminals of the direct current potential source and respective preselected positive and negative polarity output terminals regardless of the direction in which the direct current potential source is poled.

In accordance with this invention, an automatic polarity selector circuit is provided wherein the polarity of a direct current potential source connected across the input circuitry thereof is sensed by a switching arrangement which automatically completes an electric circuit between the positive and negative polarity terminals of the direct current potential source and respective preselected positive and negative polarity output terminals regardless of the direction in which the direct current potential source is poled across the input circuitry.

For a better understanding of the present invention, together with additional objects, advantages and features thereof, reference is made to the following description and accompanying single figure drawing.

In the figure, the unique automatic polarity selector circuit of this invention is schematically set forth. This circuit includes appropriate input circuitry across which a direct current potential source may be connected, positive and negative polarity output circuitry and a polarity sensitive switching arrangement which is responsive to a direct current potential applied across the input circuitry for completing an electrical circuit between the respective positive and negative polarity terminals of the direct current potential source and the respective preselected positive and negative polarity output circuitry, regardless of the direction in which the direct current potential source is poled.

For purposes of facilitating the description of the invention and without intention or inference of a limitation thereto, the input circuitry has been indicated in the figure as a pair of input terminals 12 and 14 and the output circuitry has been shown to be a pair of output terminals 16 and 18. Terminal 16 has been arbitrarily selected to be the positive polarity output terminal and terminal 18 the negative polarity output terminal. It is to be specifically understood that the selected polarity of these terminals may be reversed without departing from the spirit of the invention.

The polarity sensitive switching arrangement may include a first switching device, illustrated in the figure as an electric relay 20 having an operating coil 21 and a series connected diode 22 and two normally open contacts including movable contacts 23 and 24 and respective stationary contacts 25 and 26, which is responsive to the application of a direct current potential across input terminals 12 and 14 and poled positive and negative, respectively, for completing an electric circuit between input terminal 12 and positive polarity output terminal 16 and between input terminal 14 and negative polarity output terminal 18 and a second switching device, illustrated in the figure as an electric relay 30 having an operating coil 31 and a series connected diode 32 and two normally open contacts including movable contacts 33 and 34 and respective stationary contacts 35 and 36, which is responsive to the application of a direct current potential across input terminals 12 and 14 and poled negative and positive, respectively, for completing an electric circuit between input terminal 12 and negative polarity output terminal 18 and between input terminal 14 and positive polarity output terminal 16.

The series combination of diode 22 and operating coil 21 of relay 20 is connected across input terminals 12 and 14 between junctions 38 and 39 with diode 22 poled in such a manner that operating coil 21 may be energized only while a direct current potential applied across input terminals 12 and 14 is poled positive and negative, respectively.

The series combination of diode 32 and operating coil 31 of relay 30 is connected across input terminals 12 and 14 between junctions 38 and 39 with diode 32 poled in such a manner that operating coil 31 may be energized only while a direct current potential applied across terminals 12 and 14 is poled negative and positive, respectively.

Assuming that a direct current potential source, such as a conventional storage type battery 10 in the figure, is applied across input terminals 12 and 14 and poled positive and negative, respectively, as indicated, operating coil 21 of relay 20 is energized through a circuit including forward poled diode 22, lead 40, and lead 41 connected between junctions 38 and 39. Operating coil 31 of relay 30 will not be energized as the energizing current therefore is blocked by diode 32 which is reverse poled with input terminals 12 and 14 connected to the positive and negative polarity electrodes, respectively, of battery 10.

With operating coil 21 of relay 20 energizing to close movable contacts 23 and 24 to respective stationary contacts 25 and 26, the positive polarity electrode of battery 10 is connected to positive polarity output terminal 16 through a circuit which may be traced from input terminal 12 through junctions 38 and 42, closed contacts 23 and 25 of relay 20 and lead 44 to positive polarity output terminal 16. The negative polarity electrode of battery 10 is connected to negative polarity output terminal 18 through a circuit which may be traced from input terminal 14 through junction 39, lead 41, lead 46, closed contacts 24 and 26 of relay 20 and lead 48 to negative polarity output terminal 18.

Should the positive and negative polarity electrodes of battery 10 be poled in the opposite direction across the input terminals and be connected to input terminals 14 and 12, respectively, operating coil 31 of relay 30 would be energized through a circuit including lead 50 and forward poled diode 32 connected between junctions 38 and 39. Operating coil 21 of relay 20 will not be energized as the energizing current therefor is blocked by diode 22 which is reverse poled with input terminals 12 and 14 connected to the negative and positive electrodes, respectively, of battery 10.

With operating coil 31 of relay 30 energized to close movable contacts 33 and 34 to stationary contacts 35 and 36, respectively, the positive polarity electrode of battery 10 is connected to positive polarity output terminal 16 through a circuit which may be traced from input terminal 14, through junction 39, closed contacts 34 and 36 of relay 30 and lead 52 to positive polarity output terminal 16. The negative polarity electrode of battery 10 is connected to the negative polarity output terminal 18 through a circuit which may be traced from input terminal 12 through junctions 38 and 42, lead 54, closed contacts 33 and 35 of relay 30 and lead 56 to negative polarity output terminal 18.

While the switching arrangement has been described as electric relays, it is to be specifically understood that alternate electrical switching devices having similar characteristics may be employed without departing from the spirit of the invention.

When used with conventional storage battery chargers, the positive and negative output terminals of the charger are connected across output terminals 16 and 18, respectively, and regardless of the direction in which the battery to be charged is poled across input terminals 12 and 14, the residual potential of the battery will energize the operating coil of the relay including the forward poled diode and the unique circuit of this invention will automatically connect the positive and negative polarity electrodes of the battery to the respective positive and negative polarity output terminals of the battery charger. An additional feature provided by this novel circuitry is that inadvertent short circuiting of the output terminals of the charger is avoided as relays 20 and 30 remain unenergized in the absence of a direct current potential source connected across input terminals 12 and 14, thereby interrupting the electrical circuit between input terminals 12 and 14 and output terminals 16 and 18 by the respective normally open contacts thereof.

By combining two or more of these unique circuits, automatic polarity selection may be made between two unknown, arbitrary sources. One application of this type is the paralleling of two or more direct current potential sources to a common bus. With this application, output terminals 16 and 18 of each of the circuits is connected to respective busses and regardless of the direction in which a direct current potential source connected to input terminals 12 and 14 of these circuits is poled, the positive polarity terminals will automatically be connected to the positive polarity bus, connected to output terminal 16, and the negative polarity terminals will automatically be connected to the negative polarity bus, connected to output terminal 18.

While a preferred embodiment of the present invention has been shown and described, it will be obvious to those skilled in the art that various modifications and substitutions may be made without departing from the spirit of the invention which is to be limited only within the scope of the appended claim.

What is claimed is as follows:

1. An automatic polarity selector circuit comprising first and second input circuit means across which a direct current potential source may be connected, positive and negative polarity output circuit means having a consistent relative polarity, first and second electric relays each having an operating coil, two stationary contacts and two corresponding respective movable contacts, first and second diodes, means for connecting said operating coil of said first relay in series with one of said diodes poled in one direction across said input circuit means, means for connecting said operating coil of said second relay in series with the other one of said diodes poled in a direction opposite to that of said first diode across said input circuit means, means for connecting one stationary contact of each of said relays to said first input circuit means, means for connecting the other stationary contact of each of said relays to said second input circuit means, means for connecting the said movable contact of said first relay corresponding to the said stationary contact thereof connected to said first input circuit means to said positive polarity output circuit means, means for connecting the said movable contact of said second relay corresponding to the said stationary contact thereof connected to said second input circuit means to said positive polarity output circuit means, means for connecting the said movable contact of said first relay corresponding to the said stationary contact thereof connected to said second input circuit means to said negative polarity output circuit means and means for connecting the said movable contact of said second relay corresponding to the said stationary contact thereof connected to said first input circuit means to said negative polarity output circuit means.

References Cited

UNITED STATES PATENTS

| | | | |
|---|---|---|---|
| 3,118,101 | 1/1964 | Arber | 307—127 X |
| 3,267,301 | 8/1966 | Gignac | 307—127 |
| 3,273,039 | 9/1966 | Godshalk et al. | 307—127 X |

ROBERT K. SCHAEFER, *Primary Examiner.*

T. B. JOIKE, *Assistant Examiner.*